(12) United States Patent
Dron

(10) Patent No.: US 6,922,945 B2
(45) Date of Patent: Aug. 2, 2005

(54) SEAL FOR MOTOR VEHICLE OPENING FRAME

(75) Inventor: Bernard Dron, Puteaux (FR)

(73) Assignee: BTR Sealing Systems France, Nanterre (FR)

( * ) Notice: Subject to any disclaimer, the term of this patent is extended or adjusted under 35 U.S.C. 154(b) by 27 days.

(21) Appl. No.: 10/048,106

(22) PCT Filed: May 22, 2001

(86) PCT No.: PCT/FR01/01577

§ 371 (c)(1),
(2), (4) Date: Jun. 11, 2002

(87) PCT Pub. No.: WO01/92044

PCT Pub. Date: Dec. 6, 2001

(65) Prior Publication Data

US 2002/0152688 A1 Oct. 24, 2002

(30) Foreign Application Priority Data

May 26, 2000 (FR) .............................. 00 06731

(51) Int. Cl.$^7$ .............................................. E06B 7/18
(52) U.S. Cl. .................................... 49/477.1; 49/475.1
(58) Field of Search ............................ 49/475.1, 477.1, 49/490.1, 498.1

(56) References Cited

U.S. PATENT DOCUMENTS

| | | | | |
|---|---|---|---|---|
| 1,928,992 A | * | 10/1933 | Clark et al. ................. | 138/103 |
| 2,530,160 A | * | 11/1950 | Finley ....................... | 49/477.1 |
| 2,908,949 A | * | 10/1959 | Frehse ....................... | 49/496.1 |
| 3,025,576 A | * | 3/1962 | Herman ...................... | 49/496.1 |
| 3,178,779 A | * | 4/1965 | Clark et al. ................. | 277/646 |
| 3,491,825 A | * | 1/1970 | Matson et al. ............... | 164/228 |
| 3,548,441 A | * | 12/1970 | Kruger ....................... | 15/250.1 |
| 3,769,750 A | * | 11/1973 | Mayer et al. ................ | 49/477.1 |
| 3,869,873 A | * | 3/1975 | Thomas ....................... | 62/275 |
| 4,371,175 A | * | 2/1983 | Van Dyk, Jr. ............. | 174/35 GC |
| 4,447,065 A | * | 5/1984 | Dupuy et al. ................ | 277/642 |
| 4,448,430 A | * | 5/1984 | Bright ........................ | 277/642 |
| 4,579,192 A | * | 4/1986 | Mueller ....................... | 277/312 |
| 4,702,039 A | * | 10/1987 | Bocchinfuso ............... | 49/490.1 |
| 4,761,917 A | * | 8/1988 | Knecht et al. ............. | 49/477.1 |
| 4,813,184 A | * | 3/1989 | Weimar ....................... | 49/477.1 |
| 4,952,442 A | * | 8/1990 | Warner ........................ | 428/83 |
| 4,993,722 A | * | 2/1991 | Gundy ........................ | 277/314 |
| 4,995,196 A | * | 2/1991 | Smith ......................... | 49/477.1 |
| 5,012,615 A | * | 5/1991 | Piccinini et al. ........... | 49/477.1 |
| 5,079,873 A | * | 1/1992 | Smith ......................... | 49/477.1 |
| 5,085,005 A | * | 2/1992 | Yasukawa et al. ............ | 49/377 |
| 5,123,693 A | * | 6/1992 | Karashima et al. ......... | 296/135 |
| 5,141,280 A | * | 8/1992 | Gerrard ...................... | 296/152 |
| 5,159,781 A | * | 11/1992 | Glossop et al. .............. | 49/375 |
| 5,181,341 A | * | 1/1993 | Keys et al. ................. | 49/477.1 |
| 5,339,488 A | * | 8/1994 | Maass ........................ | 15/250.01 |
| 5,403,632 A | * | 4/1995 | Mesnel et al. ................ | 428/31 |
| 5,511,343 A | * | 4/1996 | Guillon ....................... | 49/479.1 |
| 5,622,008 A | * | 4/1997 | King .......................... | 49/498.1 |
| 5,626,383 A | * | 5/1997 | Lee et al. ................. | 296/146.9 |
| 5,671,565 A | * | 9/1997 | Furuse ........................ | 49/377 |
| 5,826,378 A | * | 10/1998 | Gallas ........................ | 49/498.1 |
| 5,866,232 A | * | 2/1999 | Gatzmanga .................. | 428/122 |
| 6,125,591 A | * | 10/2000 | Schmidhuber et al. ..... | 49/477.1 |
| 6,442,902 B1 | * | 9/2002 | Van Den Oord ........... | 49/498.1 |
| 6,677,020 B2 | * | 1/2004 | Dron ......................... | 428/36.91 |

FOREIGN PATENT DOCUMENTS

WO    WO 01/92044 A1    12/2001

* cited by examiner

Primary Examiner—Gregory J. Strimbu
(74) Attorney, Agent, or Firm—Scully, Scott, Murphy & Presser

(57) ABSTRACT

A seal with a first profiled section, a second profiled section (5) housed inside a third profiled section made of an elastically deformable flexible material, the third profile section forming by itself or with the part of the first and/or the second profiled section a sealed tubular member connected to a source of fluid under pressure and adapted under the action of the fluid, to be urged into contact with the inner face of the second profiled section (5), to improve the sealing and soundproof properties of the seal when the vehicle moves at a high speed.

7 Claims, 4 Drawing Sheets

SEAL FOR MOTOR VEHICLE OPENING FRAME

BACKGROUND OF THE INVENTION

1. Field of the Invention

The subject of the present invention is a novel seal for the surround of an opening in motor vehicle bodywork, particularly for the surround of a door, trunk, tailgate, window, quarterlight, or the like.

Such seals for surrounds of openings in motor vehicles generally comprise:

- a section piece forming a clip with a U-shaped cross section, made of elastomer or of plastomer, usually comprising a rigid armature and intended to fit over and clip onto part of the surround of the opening in the motor vehicle bodywork;
- and at least one tubular section piece made of an elastically deformable material, generally a cellular material, abutting, for example, a lateral branch or the base of the U-shaped section piece and projecting toward the outside from the surround of the opening, with a view to being compressed between the opening leaf and this surround, when the opening leaf is in the closed position, so as to seal the vehicle.

The U-shaped section piece and the tubular section piece are customarily made of thermoplastic or elastomeric materials and are produced by coextrusion.

Aside from its sealing role, when compressed by the opening leaf when the latter is in the closed position, the tubular section piece also has a function of soundproofing the cabin of the vehicle.

2. Discussion of the Prior Art

Numerous forms of embodiment of such seals are known in the state of the art and all are generally aimed at providing excellent soundproofing, without detracting too greatly from the ability of the tubular section piece to deform.

In their French patent application No. 00/04414, filed on Mar. 31, 2000 and not yet published at the date of filing of this application, the applicant company proposed a seal of the same general type as those mentioned hereinabove but which, unlike those of the prior art, which were aimed at having excellent ability to deform, locally put up increased resistance to the compression by the opening leaf when the latter was closed.

Specifically, when motor vehicle doors are highly curved, they tend to deform as the vehicle runs along at high speed, under the effect of an external depression, and it is important to be able to oppose this deformation. With a seal which puts up greater resistance to the closing of the doors, these doors, having been closed, are preloaded, which allows them better to resist the external stresses when the vehicle is moving along at high speed.

Furthermore, with certain vehicle trunks, it is sometimes necessary that, when closing the opening leaf, the trunk seal should at least locally put up sufficient resistance to this to act as an end-of-travel damper, thus avoiding vibration occurring later.

In order to meet these requirements, the applicant company, in the aforementioned patent application, proposed a seal for the surround of an opening in motor vehicle bodywork, this seal comprising a first section piece forming a clip of U-shaped cross section, made of elastomer or of plastomer, capable of sitting over and gripping a projecting part of the surround of the opening, and a second section piece of U-shaped cross section, made of an elastically deformable material, arranged to the side of the first section piece, with the ends of its branches abutting one of the flanges or the base of this first section piece, so as to form, with this flange, a tubular member, this second section piece comprising at least one orifice placing the inside of the section piece in communication with the outside and being intended to be compressed elastically via the opening leaf associated with the opening in the bodywork, when this opening leaf is in the closed position, so as to seal at the surround, this seal being characterized in that, housed inside the second section piece and along at least part of its length, is a third section piece with a U-shaped cross section, which is smaller in size than the second section piece and the ends of the branches of which also abut the same flange or the base of the first section piece, this third section piece also being made of an elastically deformable material and intended to put up local resistance to the compressive force exerted by the opening leaf, while at the same time improving the sealing and soundproofing at the surround of the opening.

Like the second section piece, the third section piece of this seal may be pierced with at least one orifice placing the inside of the section piece in communication with its outside. It may also have no such orifice, for certain applications of the seal.

The third section piece of this seal of the prior art therefore has a three-fold function:

- to put up greater resistance to the closing of the opening leaf;
- to act as an end-of-travel damper for this opening leaf when the latter reaches its closed position;
- to oppose the passage of soundwaves and thus better soundproof the cabin of the vehicle, when compressed by the opening leaf.

SUMMARY OF THE INVENTION

The present invention is concerned with a seal for the surround of an opening of the same overall type as the one which has just been described, that is to say comprising a third section piece made of an elastically deformable material housed inside the second section piece but which, unlike the seal of the prior art, contains not air at ambient pressure, but is connected to a source of fluid under pressure.

Specifically, by continuing their studies into this kind of seal, the applicant company made an attempt at meeting the following requirements:

- not to impede the normal closing of the opening leaf;
- to ensure good sealing at standstill and when the vehicle is at low speed, that is to say at a speed at which there are barely any problems of soundproofing, because of the low level of external noise;
- but above all to provide excellent sealing at high speed, when the doors tend to move outward under the effect of a depression, while at the same time improving the soundproofing, so as to respond to the far higher level of external noise.

To this end, the invention proposes to use a third section piece, within the meaning of this term given above, which, by itself or with other parts of the seal, forms a sealed closed volume connected to a source of fluid under pressure, generally a liquid, but which may also be a gas, for example air, this third section piece being made of a very flexible and very soft material which allows it to expand under a slight raised pressure to come into contact with the second section piece in which it is housed so as to:

create an additional barrier to the passage of soundwaves;

maintain satisfactory contact between the seal and the surround of the door and the door itself, even when the latter tends to move away from the surround, when the vehicle is moving along at high speed, with an additional separation which may be as much as about 3 mm, at the upper part of the door;

and even to oppose this deformation by pushing the lower part of the door outward.

To this end, the subject of the invention is a seal for the surround of an opening in motor vehicle bodywork, this seal comprising a first section piece forming a clip of U-shaped cross section, made of elastomer or of plastomer, capable of sitting over and gripping a projecting part of the surround, and a second section piece made of an elastically deformable flexible material, this second section piece abutting the outside of the base or of one of the branches of the first section piece and forming, by itself or with the part of the first section piece that it abuts, a tubular member, at least one orifice placing the inside and the outside of this second section piece in communication, and this second section piece being intended to be compressed by the opening leaf associated with the opening in the bodywork, when this opening leaf is in the closed position, so as to seal at the surround, this seal being characterized in that, housed inside the second section piece is a third section piece made of an elastically deformable flexible material which may or may not abut the first section piece or the second section piece and which forms, by itself or with the part of the first and/or second section piece that it abuts, a sealed tubular member connected to a source of fluid under pressure and capable, under the urging of this fluid, of coming into contact with the interior face of the second section piece, or even of pushing it back, in order to improve the sealing and soundproofing properties of the seal when the vehicle is moving at high speed.

As mentioned hereinabove, the third section piece is advantageously made of a very flexible material with a very low hardness, for example about 30 to 35 Shore A. The use of a material as soft as this is allowed because this third section piece is housed inside the second section piece and is thus protected from external contact.

This third section piece may be independent of the second section piece and may consist of an insert fitted into the latter, after both have been manufactured independently.

As a preference, however, the third section piece will abut the second section piece and be manufactured by coextrusion with the latter, and with the first section piece that forms the clip.

The pressure of the fluid supplied to the third section piece will advantageously be adjustable according to the speed of the vehicle, so as to increase and decrease with the latter, and it may be controlled by a Venturi effect or by a pump. This is because the section piece need not be subjected to pressure when stationary or at low speed, and it is above all at higher speed, for example upward of 80 km/h, that, when the opening leaf is subjected to an external depression and tends to move away from the surround of the opening, the pressure of the fluid needs to increase.

In the event of a severe impact, when the vehicle comprises inflatable "airbag" safety features, a safety system associated with the means of triggering of these airbags may naturally advantageously be provided so as at the same time to eliminate any pressure in the third section piece, for example by rupturing or puncturing it. Normally, the decrease in pressure of the fluid associated with the reduction in speed of the vehicle is in itself sufficient.

When this third section piece is not itself a tubular section piece, it may have a U-shaped cross section with the ends of the branches of the U secured to the second section piece or, possibly, to the first section piece if the second section piece is itself a section piece of U-shaped cross section secured by its branches to the first section piece.

The size and position of the third section piece are naturally chosen so that it does not oppose the closing of the doors.

Because of its great flexibility, it can expand under a small raised pressure to come into contact with the second section piece in which it is housed, thus creating an additional barrier to the passage of the soundwaves and a reduction in vibration, both of which considerably improve the acoustics in the vehicle cabin.

When the vehicle is running along at high speed, when the opening leaf, for example a door, tends to move away from the surround of the associated opening, the third section piece continues to expand under an increased pressure of the fluid under pressure and thus urge the second section piece in such a way that it continues to close up the space that tends to be created between the opening leaf and the surround and keep it in contact with them, also opposing this deformation over part of its length.

BRIEF DESCRIPTION OF THE DRAWINGS

Other features and advantages of the invention will become apparent in the detailed description which will follow for various implementations thereof, in its application to a motor vehicle door seal.

In this description, reference will be made to the appended schematic drawings in which.

DETAILED DESCRIPTION OF THE INVENTION

Figure 1:
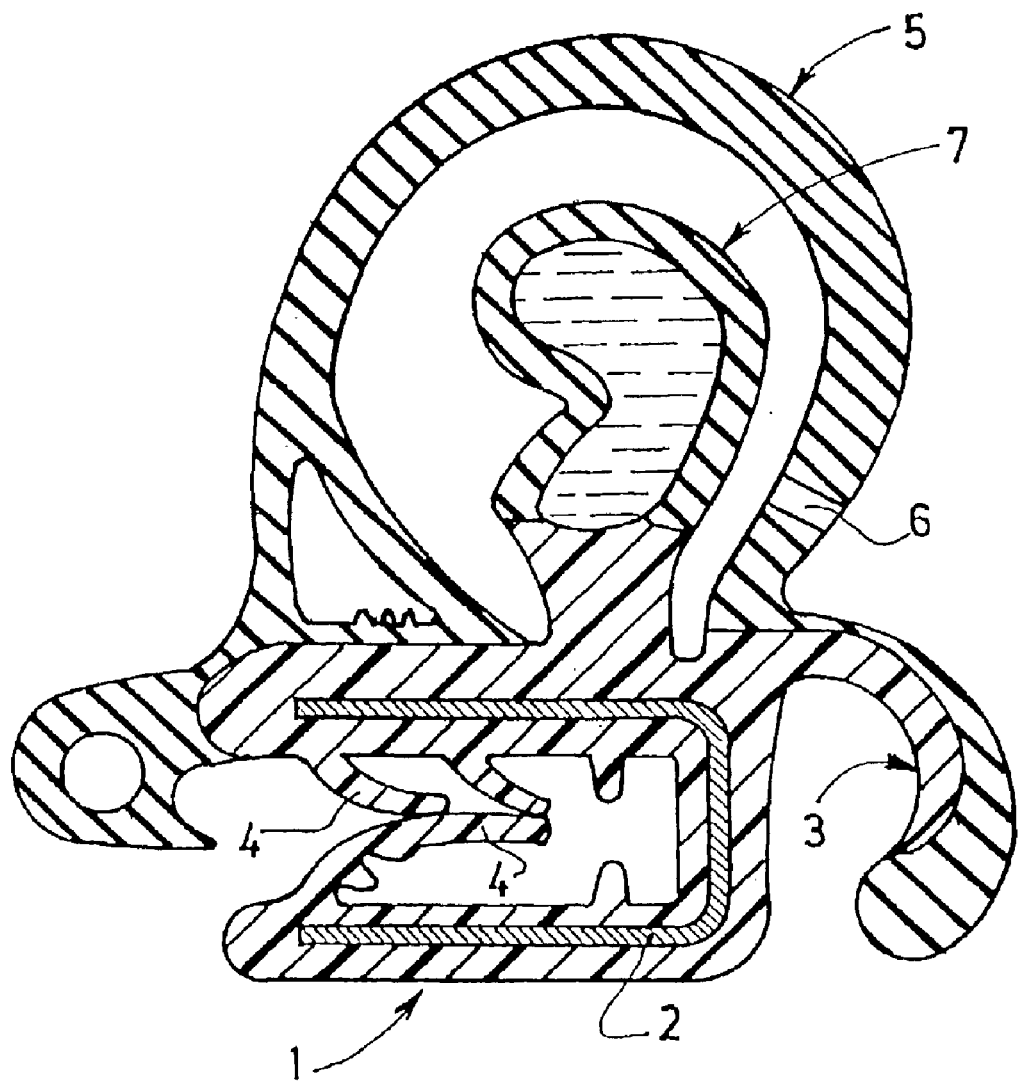
FIG. 1 is a cross section of a first embodiment of the seal, in which the third section piece, housed inside the second section piece, abuts a lateral branch of the first section piece forming a clip.
Figure 2:
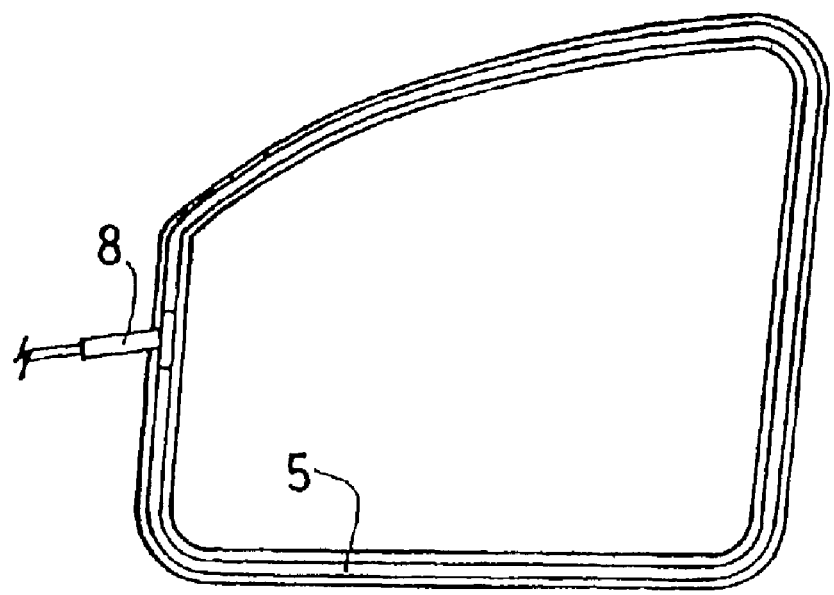
FIG. 2 is a schematic view in side elevation of the door surround associated with the seal of FIG. 1, illustrating the supply of pressurized fluid to the third section piece.

Reference will be made first of all to FIGS. 1 and 2.

The door seal depicted in these figures comprises a section piece 1 forming a clip, with a U-shaped cross section, and made of elastomer or of plastomer, equipped with a metal armature 2, also of U-shaped cross section, which is intended to sit over a projecting edge of a motor vehicle door surround. A cosmetic lip 3 protrudes laterally from the base of the U, while lips 4 made of a flexible material such as an elastomer project into the U from the branches thereof so as to firmly grip the protruding edge of the door surround.

A second section piece 5 with a U-shaped cross section, for example made of cellular rubber, laterally via the ends of its branches abuts a flange of the section piece 1 and projects toward the outside of the vehicle on the opposite side to the lip 3, forming a tubular member with the flange of the section piece 1 which it abuts. This section piece 5 is intended to be compressed and deformed between the door surround and this door, when the latter is in the closed position, so as to seal the cabin of the vehicle and soundproof it, and may be pierced with orifices 6, arranged at regular or irregular intervals along the section piece, to allow the free passage of air to the outside of the section piece or to the inside thereof.

Housed inside the section piece 5 is a third section piece 7 with a U-shaped cross section, of a smaller size, which laterally via the end of the branches of the U abuts a protruding part of the same flange of the section piece 1 as the section piece 5. With the flange of the section piece 1 which it abuts it forms a sealed tubular member of a cross section appreciably smaller than that of the section piece 5.

According to the invention, this section piece 7 is connected by a T connector 8 (see FIG. 2) to a source of a fluid which can be placed under variable pressure, controlled according to the speed of the vehicle, for example using a pump under the urging of this pressurized fluid, for example air or water containing glycol, the section piece 7, depicted at rest in the drawing, that is to say under little or no pressure, can expand to come into contact with a part of the interior face of the section piece 5 so as to improve the soundproofing qualities of the seal and keep the section piece 5 inserted between the door surround and the door, in contact with these, even when the vehicle is running at high speed.

In order to be able to expand easily, the section piece 7 will preferably be made of a soft material, with a hardness of between 30 and 35 Shore A. It may, for example, be made of cellular or compact EPDM or preferably of TPE.

Figure 3:
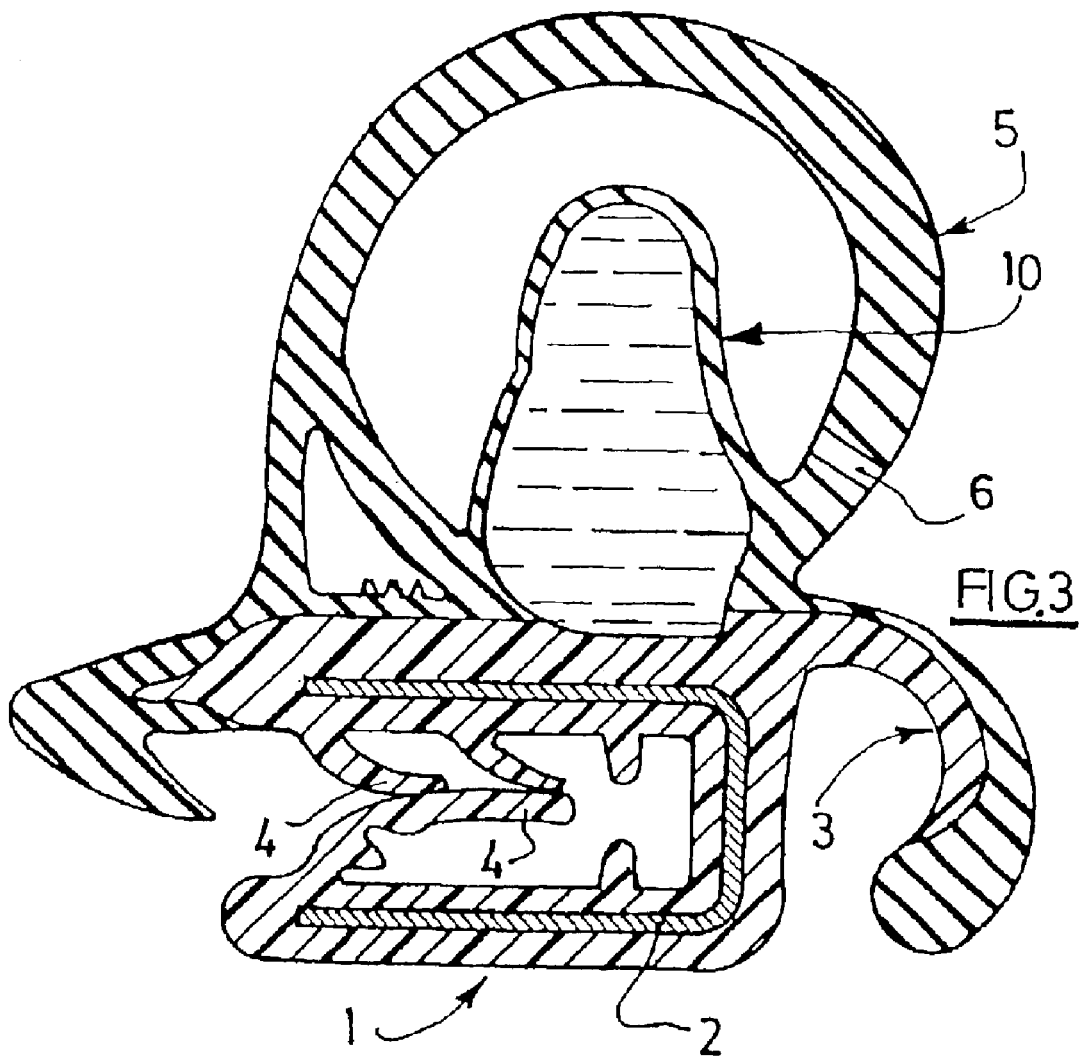
FIG. 3 is a cross section of an alternative form of the seal of FIG. 1, in which the third section piece is made of the same material as the second section piece and is one with it.

The embodiment of FIG. 3, in which the members already described are denoted by the same reference numerals as in FIG. 1, differs from the previous embodiment only in that the third section piece 10 is one with the second section piece 5 but, as before, with this section piece 5 and the section piece 1 abutting it, forms a sealed tubular member which is connected to the source of pressurized fluid.

In both the embodiments which have just been described, the first, second and third section pieces may be produced by a single coextrusion operation.

Figure 4:
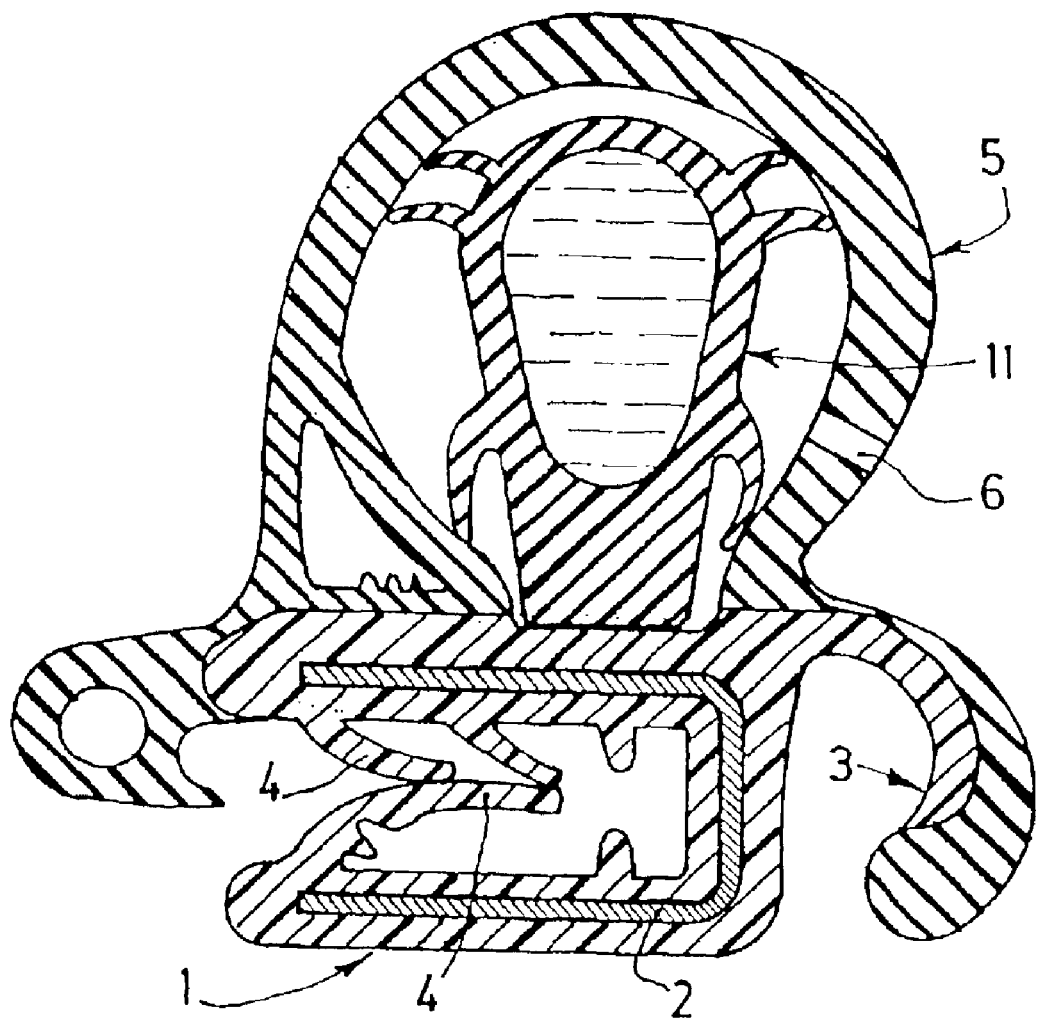
FIG. 4 is a section similar to that of FIGS. 1 and 3 of a third embodiment of the seal, in which the third section piece consists of an insert independent of the second section piece, in which it is housed.

In FIG. 4, the members which have already been described with reference to the preceding figures, are once again denoted by the same reference numerals. In the embodiment depicted in this figure, the third section piece 11, connected to the source of pressurized fluid and housed in the second section piece 5, no longer abuts the latter but is manufactured independently thereof, and introduced into it in the form of an insert. It nonetheless works in the same way as the embodiments described previously and has the same advantages.

Figure 5:
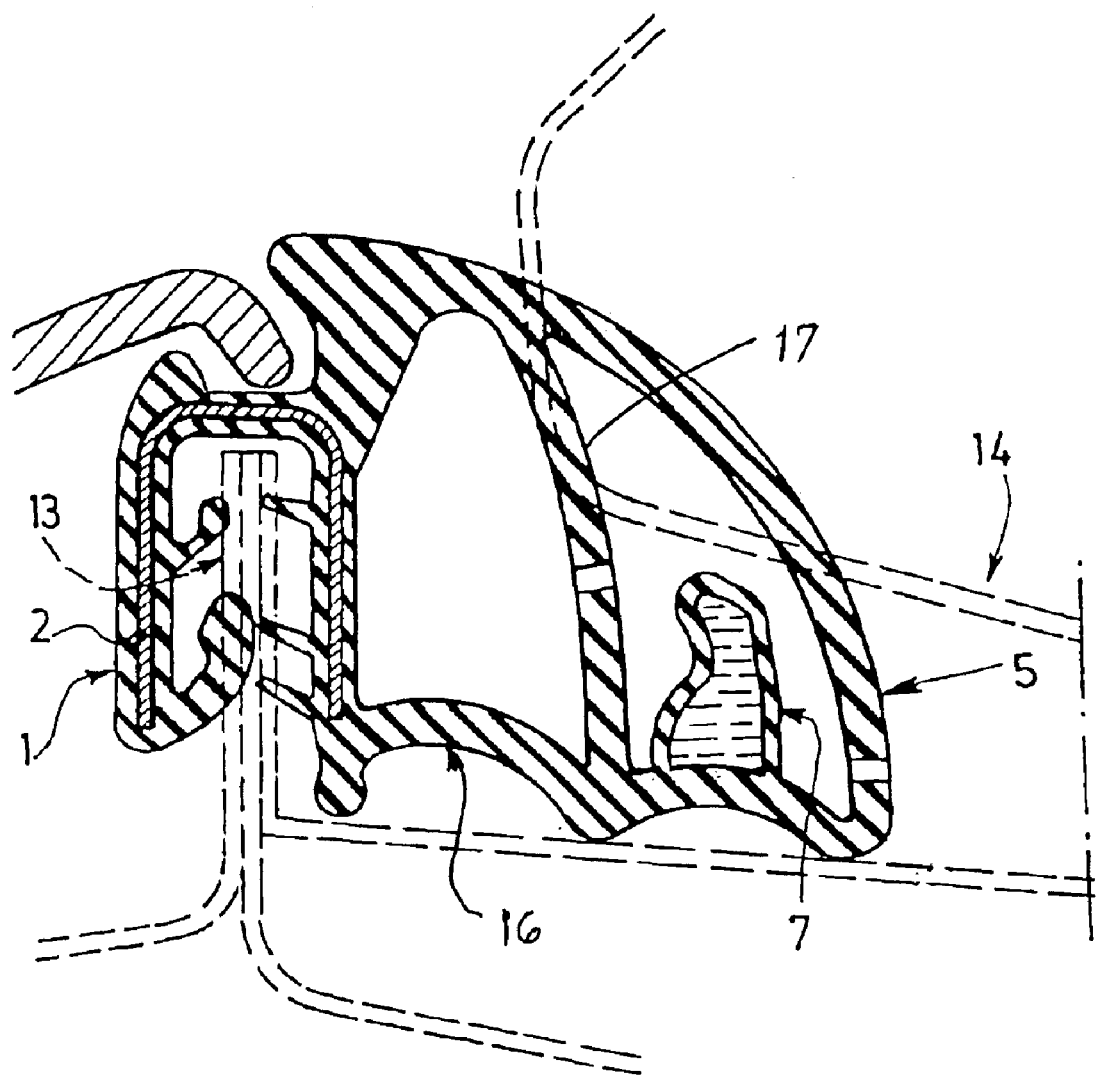
FIG. 5 illustrates another embodiment of the A seal with a first profiled section, a second profiled seal according to the invention and a preferred positioning thereof between a door and the bodywork of the vehicle.

FIG. 5, in which the members already described are once again denoted by the same reference numerals, depicts another embodiment of the seal according to the invention, with the section piece 1 forming the clip in the position of use on the rabbet 13 that constitutes the protruding edge of the door surround.

In this embodiment, the second and third section pieces 5 and 7 are arranged in such a way as to be compressed by the door 14 of the vehicle between the panel 15 of the vehicle bodywork, and another tubular section piece 16, separated from the section piece 5 by a partition 17, abuts a branch of the section piece 1 and is inserted between it and the section piece 5.

In all the embodiments, the second and/or third section piece(s) may be coated locally, on their external and/or internal surface, with a film of a material different than that of which said section pieces are made, or of the same material, but with different physical properties, so as to form barriers to the passage of soundwaves. These films preferably extend only over part of the length and cross section of the section pieces, so as to disturb their ability to deform only locally and to a minimal extent.

In all its embodiments, the great simplicity of the seal according to the invention will be noted, which seal may be manufactured easily using methods which are well known to those skilled in the art.

What is claimed is:

1. An automotive seal for a surround of an opening formed in a bodywork of a motor vehicle, said seal comprising a first section piece (1) forming a clip of U-shaped cross section, which is adapted to seat over and grippingly engage a projecting part of the surround; a second section piece (5) consisting of an elastically deformable flexible material, said second section piece abutting an outside of a branch of said first section piece and forming a tubular member, at least one orifice (6) in said second section piece fluidly communicating the inside of said second section piece with the outside of said second section piece, said second section piece being compressible by an opening leaf operatively associated with the opening in the bodywork upon said opening leaf being in a closed position; and a third section piece (7, 10, 11) consisting of an elastically deformable flexible material having a hardness of between about 30 to about 35 Shore A being housed within the confines of said second section piece (5), said third section piece (7, 10, 11) forming a sealed tubular member connected to a source supplying a non compressible liquid under a variably controllable pressure to said sealed tubular member of gas-tight and liquid-tight construction and which is expansively deformable in response to said pressure generated by said liquid for coming into surface contact with an interior wall surface of said second section piece (5) so as to enhance the sealing and soundproofing properties of the seal.

2. A seal according to claim 1, wherein said third section piece (7) is adapted to be spaced inwardly from the interior wall surface of said second section piece (5) lower traveling speeds or stationary condition.

3. A seal according to claim 1, wherein said third section piece (10) is integrally formed with said second section piece (5).

4. A seal according to claim 1, wherein said second section piece (5) and said third section piece (7, 10) are formed by coextrusion with the first section piece (1).

5. A seal according to claim 1, wherein said third section piece (11) is a closed tubular member produced separately from said second section piece (5) and mounted inside said second section piece.

6. A seal according to claim 1, wherein the source of said pressurized liquid conveys said liquid into said third section piece at a pressure which increases with an increase in the speed of the vehicle.

7. A seal according to claim 1, wherein said liquid consists of water containing glycol.

* * * * *